United States Patent Office 2,969,653
Patented Jan. 31, 1961

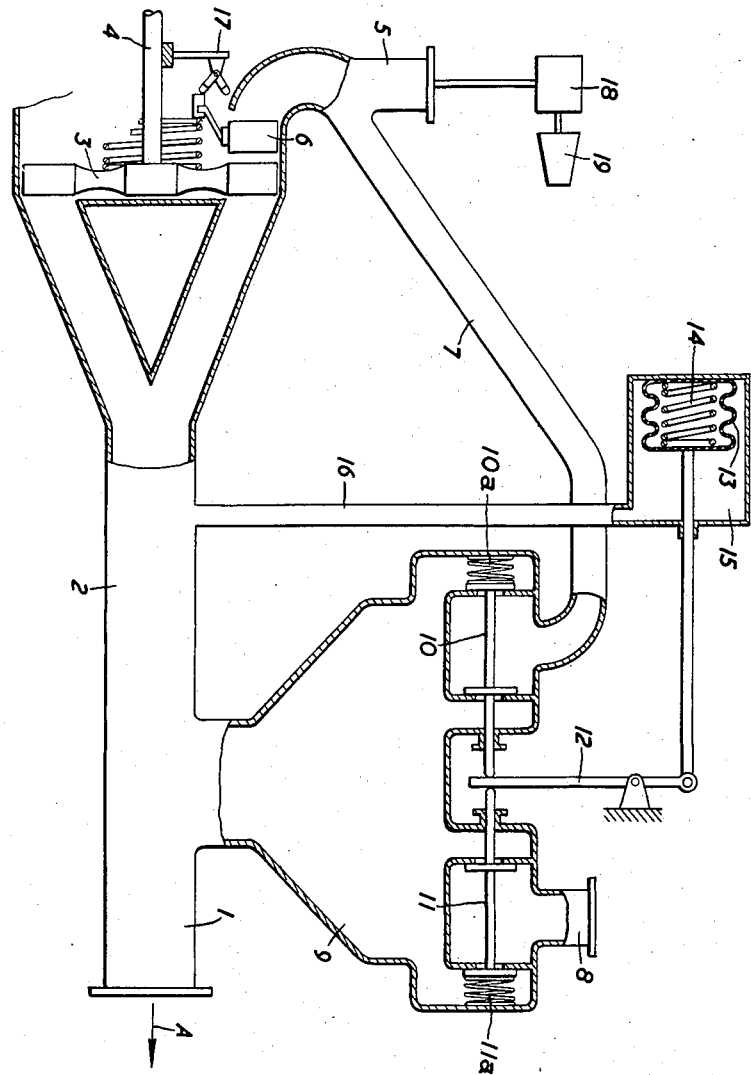

---

2,969,653
AUXILIARY POWER SYSTEMS ASSOCIATED WITH AIRCRAFT TURBINES

David Roy Trowbridge, near Brentwood, and Norman Moss, London, England, assignors to The Plessey Company Limited, London, England, a company of Great Britain Filed Dec. 3, 1959, Ser. No. 857,227
2 Claims. (Cl. 62—172)

In modern aircraft propelled by jet or turbo-propeller engines a convenient way of supplying power to accessories is to utilise a portion of air, referred to as an air bleed, from the air supply system for the main engines by expanding the bleed air through a suitable turbine. In addition to this there is a requirement for a supply of pressurised air for the interior of the aircraft so as to compensate for changes in atmospheric conditions with increasing altitude.

Two separate air bleeds could be made for supplying accessory turbines and cabin respectively, but it will be readily appreciated that a single bleed could supply both needs with attendant saving in total bleed-air flow by utilising the expanded air from the turbine exhaust to pressurise the cabin.

This invention has for a general object to provide a convenient combination of an accessory turbine and a cabin-air supply.

Another object is to provide an improved bleed air utilisation system including an auxiliary power turbine driven by bleed air and a cabin duct pressurisation system which is of improved economy in the use of bleed-air. Yet another object is to provide a combined system comprising an auxiliary power turbine and a cabin pressurisation system, in which the exhaust of the auxiliary power turbine is normally used for feeding the cabin pressurisation duct and in which nevertheless adequate auxiliary power and an adequate cabin pressure are always available.

According to the invention the exhaust of the bleed-air turbine is connected to the pressurisation duct leading to the cabin, means being provided for maintaining the outlet pressure of the bleed-air turbine constant by automatically compensating variations of this pressure by admitting bleed air direct to the outlet of the bleed-air turbine, thus by-passing that turbine, when the pressure at the outlet of the bleed air turbine tends to fall, and for dumping part of the bleed air turbine outlet, thus by-passing the cabin, when the said outlet pressure tends to increase.

One embodiment of the invention is diagrammatically illustrated in the drawing accompanying the specification.

A cabin pressurisation duct 1 which serves to feed pressurisation air to an aeroplane cabin in the direction of the arrow A, is connected to the outlet duct 2 of a bleed-air turbine having a turbine wheel 3 mounted on a power-output shaft 4. Bleed air from the compressor 18 of the aeroplane propulsion turbine 19 arriving through a duct 5, is admitted to the turbine wheel 3 at a variable rate, to compensate for variations of the turbine load and of the bleed-air pressure, the admission being controlled by adjustable guide vanes 6 operated by a centrifugal governor 17. With a system as so far described, the supply of pressurisation air to the cabin would be liable to variation due to variations of the bleed-air pressure and of the load of the auxiliary turbine 3. Means are therefore provided to compensate for such variations by a suitably controlled admission of bleed air through a line 7 by-passing the turbine 3 or by dumping of excess air through an exhaust outlet 8 by-passing the pressurised system 1. The lines 7 and 8 are connected to a valve chest 9. The latter communicates with the pressurisation line 1 and turbine exhaust 2 and is equipped with two valves 10 and 11 which respectively control communication of the valve chest 9 with the direct bleed-air inlet 7, by-passing the turbine 3 and with the exhaust outlet 8. The valves 10 and 11 are selectively operated by a pressure controlled element 12 actuated by a pressure-sensing device constituted by an evacuated pressure capsule 13 containing a spring 14. This capsule is arranged in a chamber 15 communicating with the turbine exhaust 2 through a pipe connection 16. When the pressure in the exhaust 2 corresponds to the desired cabin pressurisation pressure, the capsule assumes the illustrated neutral position in which the pressure-control member 12 clears the stems of both valves 10 and 11, thus allowing these valves to remain closed under the action of their respective springs 10a and 11a. When the exhaust from the turbine is insufficient to supply air to the cabin at the desired rate and maintain the desired constant pressure in the turbine exhaust 2, the decreasing pressure in chamber 15 allows the spring 14 to expand the pressure capsule 13. As a result of this expansion the valve control member 12 forces the bleed-air by-pass valve 10 to open and thus to admit bleed air direct from the bleed-air supply 5 to the cabin-supply line 1 through the valve chest 9, thereby preventing an undue drop in the pressurisation air pressure. When on the other hand the turbine 3 supplies more exhaust air than is required to maintain the pressurisation air supply to the cabin at the desired rate, the pressure in the exhaust line 2 tends to rise and, acting in chamber 15, will compress the pressure capsule 13 against the action of the spring 14 so that, through the valve-control element 12, the air-dumping valve 11 will be opened against the pressure of its spring 11a, allowing the excess air from the exhaust line 2 to be dumped through valve chest 9 and exhaust outlet 8.

It will be obvious to those skilled in the art that the invention is not limited to all the details of the embodiment described and that, for example, the construction of the valves 10 and 11 and of their control means, as well as the means for controlling the speed of the turbine 3, may be varied without exceeding the scope of the present invention.

What we claim is:
1. In an aeroplane having a propulsion unit including a compressor equipped with a bleed, and an auxiliary turbine driven by bleed air from the compressor bleed, a pressurisation duct for the aeroplane cabin, and means for supplying air from the compressor bleed to the pressurisation duct: the combination of a valve chest freely communicating with the turbine exhaust and the cabin pressurisation duct and having a connection to the bleed of the compressor, a valve governing said bleed connection, an atmospheric vent for said valve chest, a valve controlling said vent, and a pressure sensing element responsive to the pressure in said pressurisation duct to progressively open the valve in said bleed air connection as the pressure in the duct tends to fall below a predetermined value and to progressively open said vent valve as the pressure in said duct tends to increase above said predetermined value.

2. Equipment as claimed in claim 1, wherein the pressure sensing element includes an evacuated spring-loaded capsule exposed to the pressure in said pressurisation duct and coupled to said valve in the bleed air connection and to said vent valve.

References Cited in the file of this patent
UNITED STATES PATENTS
2,632,307    Massey ---------------- Mar. 24, 1953